US012615150B2

(12) United States Patent
   Guzik

(10) Patent No.: US 12,615,150 B2
(45) Date of Patent: Apr. 28, 2026

(54) TOKENIZED COMMODITY TENDERING ON A DISTRIBUTED PLATFORM

(71) Applicant: S&P Global Inc., New York, NY (US)

(72) Inventor: Stanley Guzik, Ridgewood, NJ (US)

(73) Assignee: S&P Global Inc., New York, NY (US)

( * ) Notice: Subject to any disclaimer, the term of this patent is extended or adjusted under 35 U.S.C. 154(b) by 441 days.

(21) Appl. No.: 18/054,862

(22) Filed: Nov. 11, 2022

(65) Prior Publication Data

US 2024/0163101 A1     May 16, 2024

(51) Int. Cl.
   *H04L 9/32* (2006.01)
   *G06F 16/28* (2019.01)
(52) U.S. Cl.
   CPC .......... *H04L 9/3213* (2013.01); *G06F 16/284* (2019.01)
(58) Field of Classification Search
   CPC ....... H04L 9/3213; H04L 9/3239; H04L 9/50; G06F 16/284
   USPC ........................................................ 713/168
   See application file for complete search history.

(56) References Cited

U.S. PATENT DOCUMENTS

| | | | |
|---|---|---|---|
| 2018/0198617 A1* | 7/2018 | Drouin | .................. H04L 9/3213 |
| 2019/0279241 A1* | 9/2019 | DiTomaso | .............. G06F 16/27 |
| 2021/0082044 A1* | 3/2021 | Sliwka | .................. H04L 9/3255 |
| 2021/0133737 A1* | 5/2021 | Kinney | .............. G06Q 30/0185 |
| 2022/0027896 A1* | 1/2022 | Goldstein | .......... G06Q 20/3827 |
| 2023/0117135 A1* | 4/2023 | Quigley | ............. G06Q 20/3678 |
| | | | 705/65 |

* cited by examiner

*Primary Examiner* — Kuen S Lu
(74) *Attorney, Agent, or Firm* — Yee & Associates, P.C.

(57) ABSTRACT

A computer implemented method for managing tokens on a blockchain platform. The method uses a number of processor units to receive a first set of attributes associated with a number of items and a second set of attributes associated with a number of offers to purchase the number of items. The number of processor units creates an item token on the blockchain platform for each item from the number of items based on the first set of attributes to form a number of item tokens. The number of processor units create a request token on the blockchain platform for each offer to purchase based on the second set of attributes to form a number of request tokens. The number of processor units create a number of matching tokens and a number of trades based on the matching tokens.

33 Claims, 13 Drawing Sheets

500

506

510

508

504

502

IT ALL STARTS
WITH A NODE
600

602

HAS AN OWNER

ISSUES
TRANSACTION

ID = DIGITAL
CERTIFICATION

COPY OF
LEDGER

SIGN
TRANSACTIONS

SHARED
LEDGER
700

602

BLOCKS
702

EACH BLOCK HAS A
DIGITAL FINGERPRINT OF
THE PREVIOUS BLOCK

FORMING A
BLOCKCHAIN
NETWORK
800

802

806

804

TRANSACTIONS
AND DISTRIBUTION
900

902

LEADER
ELECTION
1000

1002

UPDATE A=100

EXECUTION
AND RECOVERY
1100

NOW A=100

THEN A=10

ANSWER
VALIDATED

AUTONOMOUS
AGENT AND
MESSAGES
1200

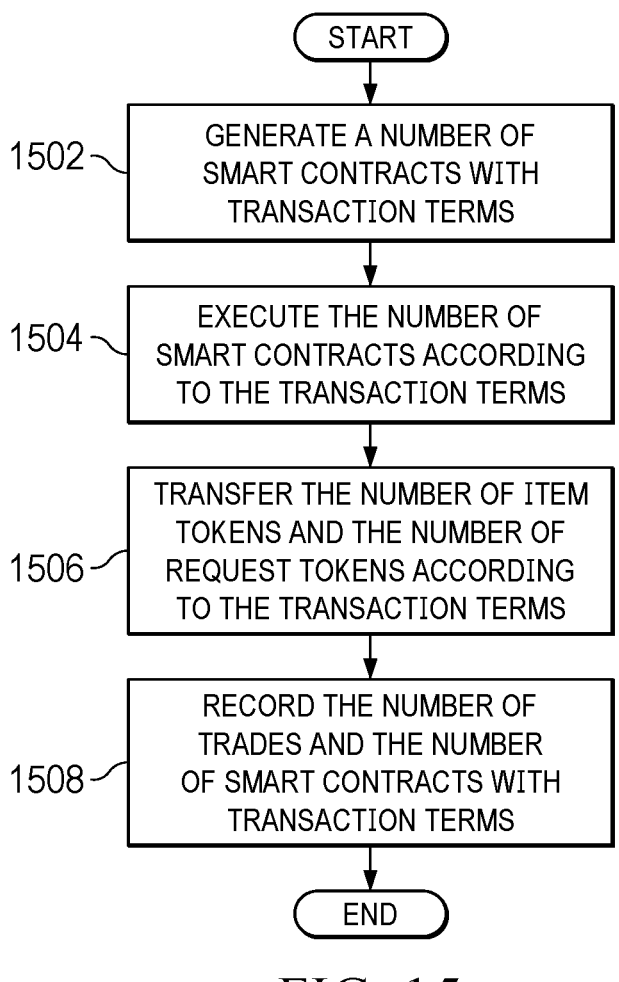

START

1502 — GENERATE A NUMBER OF SMART CONTRACTS WITH TRANSACTION TERMS

1504 — EXECUTE THE NUMBER OF SMART CONTRACTS ACCORDING TO THE TRANSACTION TERMS

1506 — TRANSFER THE NUMBER OF ITEM TOKENS AND THE NUMBER OF REQUEST TOKENS ACCORDING TO THE TRANSACTION TERMS

1508 — RECORD THE NUMBER OF TRADES AND THE NUMBER OF SMART CONTRACTS WITH TRANSACTION TERMS

END

FIG. 15

START

STORE THE MATCHING TOKENS TO A RELATIONAL DATABASE — 1602

GENERATE A MAPPING OF TOKENS IN THE RELATIONAL DATABASE — 1604

END

FIG. 16

TOKENIZED COMMODITY TENDERING ON A DISTRIBUTED PLATFORM

BACKGROUND INFORMATION

1. Field

The present disclosure relates generally to smart contracts for use with a distributed ledger, and more specifically tendering a commodity between parties using smart contract on a blockchain platform.

2. Background

A distributed ledger, as used throughout this document, refers to a computer-only technology that enables a distributed recordation of transactions maintained by a network of computers. A blockchain is a type of distributed ledger, which includes digitally-recorded, unmodifiable data in packages called blocks. A distributed ledger is a consensus of replicated, shared, and synchronized digital data geographically spread across multiple computers which may be in different sites, countries, and/or institutions maintained by many different parties. A distributed ledger can be public, such as Bitcoin, where there is no limitation on who may participate in the network, or private, where only approved parties are permitted to participate in the network.

Smart contracts are programs stored on blockchain platforms that runs automatically when predetermined conditions are met. Typically, smart contracts can be used to automate the execution of an agreement or a workflow by triggering the next action when conditions are met.

SUMMARY

An illustrative embodiment provides a computer-implemented method for managing tokens on a blockchain platform. The method comprises receiving a first set of attributes associated with a number of items and a second set of attributes associated with a number of offers to purchase the number of items. Creating an item token on the blockchain platform for each item from the number of items based on the first set of attributes to form a number of item tokens. Creating a request token on the blockchain platform for each offer to purchase based on the second set of attributes to form a number of request tokens. Creating a number of matching tokens, wherein each matching token comprises one request token and one or more item tokens, and wherein the request token and item tokens comprising the matching token are matched according to their attributes. Creating a number of trades with the matching tokens, wherein each trade comprises a match between the one request token and one of the item tokens comprising the matching token.

Another illustrative embodiment provides a system for managing tokens on a blockchain platform. The system comprises a storage device configured to store program instructions and a number of processor units in communication with the storage device, wherein the number of processor units executes program instructions to: receive a first set of attributes associated with a number of items and a second set of attributes associated with a number of offers to purchase the number of items; create an item token on the blockchain platform for each item from the number of items based on the first set of attributes to form a number of item tokens; create a request token on the blockchain platform for each offer to purchase based on the second set of attributes to form a number of request tokens; create a number of matching tokens, wherein each matching token comprises one request token and one or more item tokens, and wherein the request token and item tokens comprising the matching token are matched according to their attributes; and create a number of trades with the matching tokens, wherein each trade comprises a match between the one request token and one of the item tokens comprising the matching token.

Another illustrative embodiment provides a computer program product for managing tokens on a blockchain platform. The computer program product comprises a computer-readable storage medium having program instructions embodied thereon to perform the steps of: receiving a first set of attributes associated with a number of items and a second set of attributes associated with a number of offers to purchase the number of items; creating an item token on the blockchain platform for each item from the number of items based on the first set of attributes to form a number of item tokens; creating a request token on the blockchain platform for each offer to purchase based on the second set of attributes to form a number of request tokens; creating a number of matching tokens, wherein each matching token comprises one request token and one or more item tokens, and wherein the request token and item tokens comprising the matching token are matched according to their attributes; and creating a number of trades with the matching tokens, wherein each trade comprises a match between the one request token and one of the item tokens comprising the matching token.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 15 is a flowchart of a process for managing smart contract with tokens in accordance with an illustrative embodiment;

FIG. 16 is a flowchart of a process for analyzing tokens is depicted in accordance with an illustrative embodiment.

DETAILED DESCRIPTION

Figure 1:
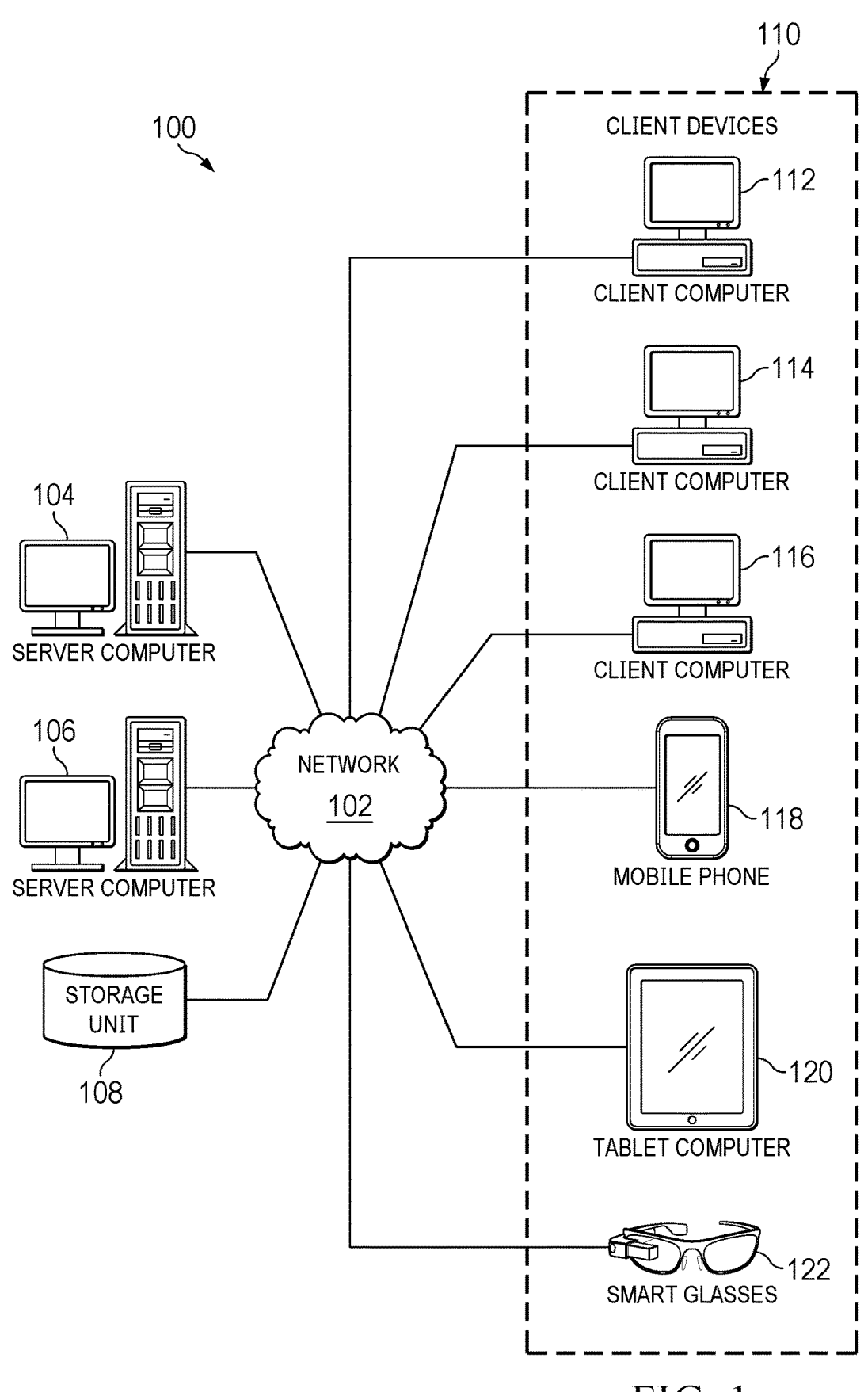
FIG. 1 is an illustration of a data processing environment depicted in accordance with an illustrative embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The different illustrative embodiments recognize and take into account one or more different considerations. For example, the illustrative embodiments recognize and take into account that tracking the status and information of commodities can be difficult when large amounts of commodities are involved in a transaction.

The illustrative embodiment also recognizes and take into account that each item represented by non-fungible tokens is unique and non-fungible while the completely fungible tokens are of indefinite quantity and are freely interchangeable within the same kind. The illustrative embodiments recognize and take into account that tokens can be used to represent a batch of items and possess properties from both non-fungible tokens and fungible tokens.

The illustrative embodiment also recognizes and take into account that a trading platform possesses huge amounts of trading data that can be analyzed for recommendations for trades based on user profiles, transaction history, and user requests. The illustrative embodiment also recognizes and take into account that the execution and generation of smart contracts can be more efficient when implementing real-time analytics.

As used herein, a "token," when used with reference to physical or conceptual assets on a blockchain platform, means a digital representation of the physical or conceptual asset, and can include value or rights that is offered or sold. For example, an "item token" can refer to a digital representation of an item to be sold by a seller on a blockchain platform.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In this illustrative example, storage unit 108 can be a centralized storage for network 102 that is independent of client devices in client devices 110. In another illustrative example, information can be stored and distributed manner in client devices 110, server computer 104, and server computer 106.

In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102. Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
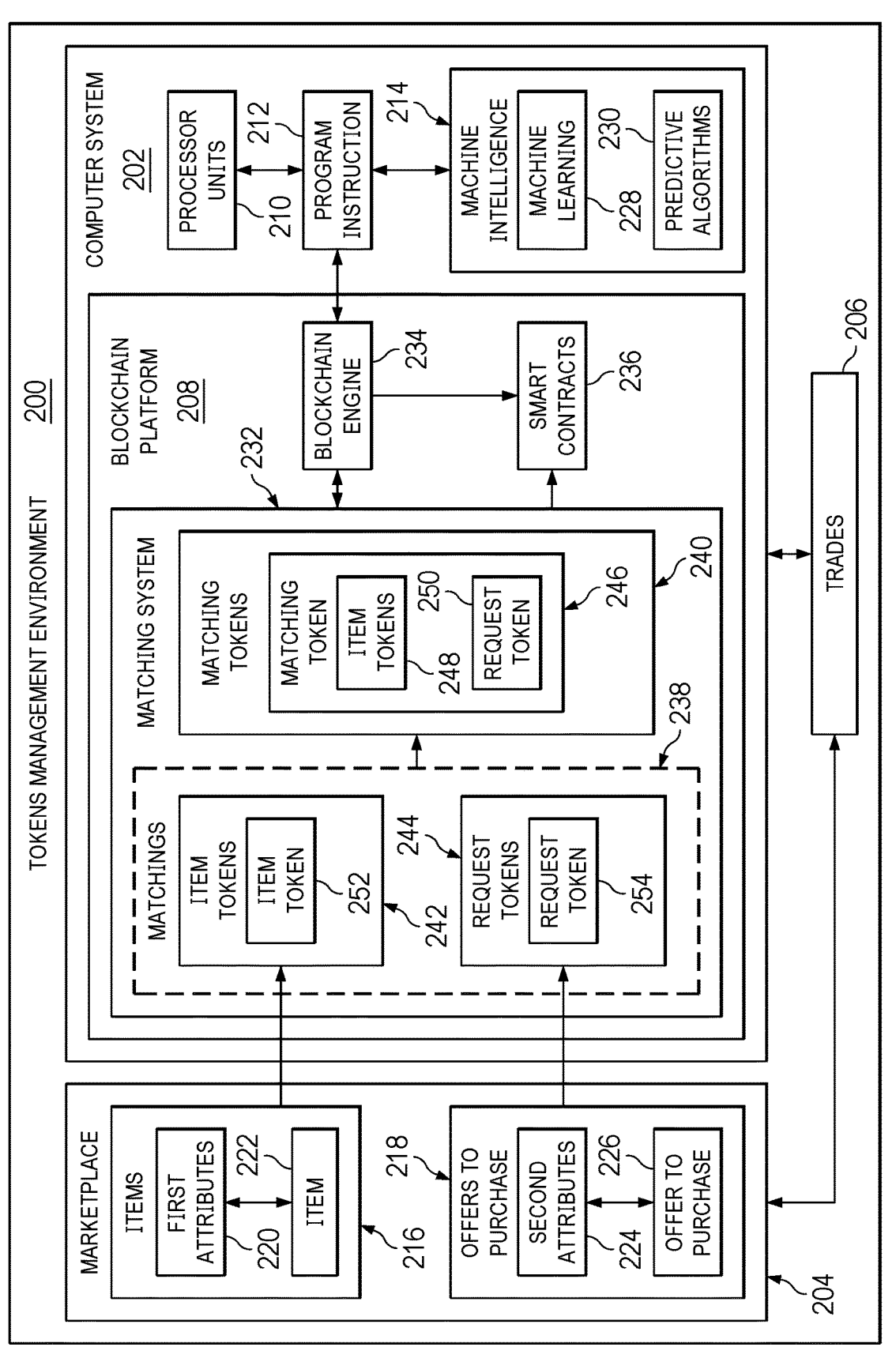
FIG. 2 is a block diagram of a tokens management environment is depicted in accordance with an illustrative embodiment.

With reference now to FIG. 2, a block diagram of a tokens management environment is depicted in accordance with an illustrative embodiment. In this illustrative example, tokens management environment 200 includes components that can be implemented in hardware, such as the hardware shown in network data processing system 100 in FIG. 1.

Tokens management environment 200 includes a marketplace 204. Marketplace 204 is a platform that connects buyers and sellers for trading purposes. In this illustrative example, marketplace 204 can be a virtual platform such as a e-commerce platform.

Marketplace 204 comprises items 216 and offers to purchase 218. In this example, items 216 can be anything sellable from sellers. For example, items 216 can be commodities such as copper, wheat, or crude oil, products such as appliances and jewelry, services such as legal services or consulting services, and real estate such as commercial real estate or residential real estate.

In this illustrative example, each item 222 of items 216 has first attributes 220 associated with item 222. First attributes 220 can are features or properties that describes item 222. For example, if item 222 is a commodity, first attributes 220 can include geographic origin, grade, price, and quantity. In an alternative example, if item 222 is real estate, first attributes 220 can include square footage, price, and location.

Offers to purchase 218 are offers made by buyers to purchase items such as items 216. In this example, each offer to purchase 226 of offers to purchase 218 is associated with second attributes 224. As depicted above, second attributes 224 can be any feature or property that describes offer to purchase 226. For example, second attributes 224 can be items that buyer wishing to buy, offer price, grade of items the buyer wishes to buy, and preferred transaction terms.

In this illustrative example, tokens management environment 200 includes a computer system 202 that comprises a number of different components. Computer system 202 comprises blockchain platform 208. Blockchain platform 208 can be used to manage tokens and match items 216 with offers to purchase 218 in marketplace 204.

As depicted, blockchain platform 208 includes a matching system 232 for matching items 216 with offers to purchase 218 in marketplace 204. Matching system 232 converts items 216 into item tokens 242 on blockchain platform 208 using a blockchain engine 234 operating in connection with the blockchain platform 208. In this illustrative example, a blockchain engine 234 converts each item 222 of items 216 to an item token 252 of item tokens 242 based on the first attributes 220. In some illustrative example, blockchain engine 234 is constructed under protocols that provide additional processing power for the blockchain platform 208. For example, the protocols can be smart contracts, or any suitable software that can operate on blockchain.

Blockchain engine 234 can be implemented in software, hardware, firmware or a combination thereof. When software is used, the operations performed by blockchain engine 234 can be implemented in program instructions configured to run on hardware, such as a processor unit. When firmware is used, the operations performed by blockchain engine 234 can be implemented in program instructions and data stored in persistent memory to run on a processor unit such as a processor unit of processor unit 210. When hardware is employed, the hardware can include circuits that operate to perform the operations in blockchain engine 234.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As depicted, computer system 202 includes a number of processor units 210 that are capable of executing program instructions 212 implementing processes in the illustrative examples. As used herein a processor unit in the number of processor units 210 is a hardware device and is comprised of hardware circuits such as those on an integrated circuit that respond and process instructions and program code that operate a computer. When a number of processor units 210 execute program instructions 212 for a process, the number of processor units 210 is one or more processor units that can be on the same computer or on different computers. In other words, the process can be distributed between processor units on the same or different computers in a computer system. Further, the number of processor units 210 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Similarly, matching system 232 converts offers to purchase 218 into request tokens 244 on blockchain platform 208 using the blockchain engine 234. In this illustrative example, a blockchain engine 234 converts each offer to purchase 226 of offers to purchases 218 to a request token 254 of request tokens 244 based on the second attributes 224.

Matching system 232 uses the blockchain engine 234 to perform matching between item tokens 242 and request tokens 244. In this illustrative example, blockchain engine 234 matches items tokens 242 and request tokens 244 based on first attributes 220 of item 222 for items 216 and second attributes 224 of offer to purchase 226 for offers to purchase 218.

In this illustrative example, blockchain engine 234 generates matching tokens 240 after a matching 238 has been identified between item tokens of item tokens 242 and request token of request tokens 244. Each matching token 246 of matching tokens 240 includes a request token 250 from request tokens 244 and a number of item tokens 248 from item tokens 242.

For example, a request token that represents an offer to purchase 2000 kg grade A wheat grain at price of $400 per 100 kg may be matched with an item token that represents 2000 kg of grade A wheat grain at price of $400 per 100 kg.

In the situation that an exact match cannot be found, the blockchain engine 234 can generate matchings between one request token to multiple item tokens, or one request token to one item token that has the closest attributes. For example, if an exact match cannot be found for a request token that represents an offer to purchase 2000 kg grade A wheat grain at price of $400 per 100 kg, the blockchain engine can identify 4 item tokens of 500 kg grade A wheat grain at price of $400 per 100 kg for matching, or 1 item token of 1000 kg grade A wheat grain at price of $500 per 100 kg and 1 item token of 1000 kg grade A wheat grain at price of $300 per 100 kg for matching.

In an alternative example, if an exact match cannot be found for a request token that represents an offer to purchase 2000 kg grade A wheat grain at price of $400 per 100 kg, the blockchain engine can also identify an item token that represents 2000 kg grade A wheat grain at price of $398 per 100 kg, which is the closest match can be found on blockchain platform 208, for a matching.

Blockchain engine 234 also generates smart contracts 236 for secure execution of trades 206 between items 216 and offers to purchase 218 based on matching tokens 240. In this illustrative example, a number of smart contracts are generated for each matching token 246 of matching tokens 240. Smart contracts 236 are generated using attributes associated with item tokens 248 and requests token 250 of matching token 246. In this example, smart contracts 236 can be generated manually through user input, or automatically generated by blockchain engine 234 using machine intelligence 214. The blockchain engine 234 can perform functional similarity matching or substitution matching in addition to the description matching as described above. For example, the blockchain engine may learn that a light/sweet crude oil from Region A is equivalent to a medium/sweet crude from Region B and match the two accordingly. In addition, a request token may merely specify a purpose such as "livestock feeding" without specifying all the details for an asset, the blockchain engine 234 may learn that both wheat or corn of a certain grade are fit for livestock feeding and will perform the matching accordingly.

Computer system 202 further includes machine intelligence 214. Machine intelligence 214 comprises machine learning 228 and predictive algorithms 230. Machine learning 228 is a branch of artificial intelligence (AI) that enables computers to detect patterns and improve performance without direct programming commands. Rather than relying on direct input-commands to complete a task, machine learning 228 relies on input-data. The data is fed into the machine, one of predictive algorithms 230 is selected, parameters for the data are configured, and the machine is instructed to find patterns in the input data through optimization algorithms. The data model formed from analyzing the data is then used to predict future values. In this illustrative example, the learning of the blockchain engine 234 can be achieved through a database input that is continuously refined overtime through trial and error. Equivalence of assets or products can be effectively performed by supervised machine learning so that products or assets that do not match descriptively can nevertheless be matched. Overtime, the data model from machine learning can provide a greater degree of flexibility in matching for the blockchain engine 234.

Machine intelligence 214 can be implemented using one or more systems such as an artificial intelligence system, a neural network, a Bayesian network, an expert system, a fuzzy logic system, a genetic algorithm, or other suitable types of systems. Machine learning 228 and predictive algorithms 230 may make computer system 202 a special purpose computer for dynamic predictive modelling of the ability of local area economies to hire additional workers.

Figure 3:
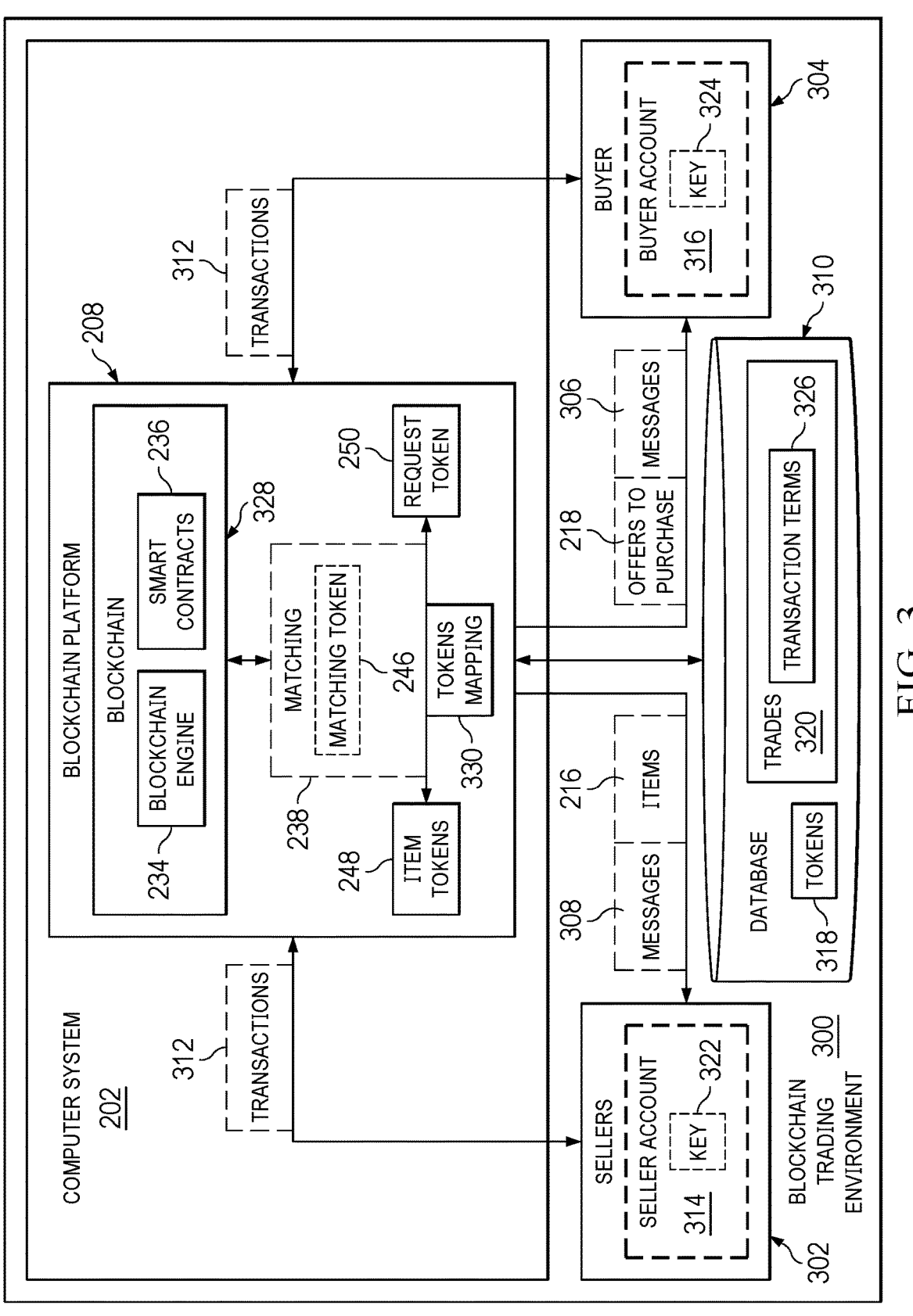
FIG. 3 is a block diagram of a blockchain trading environment for executing transactions is depicted in accordance with an illustrative embodiment.

With reference now to FIG. 3, a block diagram of a blockchain trading environment for executing transactions is depicted in accordance with an illustrative embodiment. In this example, FIG. 3 illustrates how trades 206 in FIG. 2 are managed and executed using blockchain platform 208 in FIG. 2. In this illustrative example, an exemplary trade illustrates transactions between one offer to purchase and one or more items. It should be understood that the illustrative example only present one embodiment of the present disclosure. For example, a trade with transactions between multiple offers to purchase and multiple items can also be achieved by the present disclosure. In the illustrative examples, the same reference numeral may be used in more than one figure. This reuse of a reference numeral in different figures represents the same element in the different figures.

In this illustrative example, computer system 202 manages and executes trade transactions between buyers and sellers. In this illustrative example, a number of transactions 312 are executed between one or more sellers 302 and buyer 304 through blockchain platform 208 implemented in computer system 202.

As depicted above, blockchain platform 208 includes a blockchain engine 234 that can be used to generate item tokens 248 based on attributes of items 216 and request token 250 based on attributes of offers to purchase 218 on the blockchain platform 208. In this example illustrated in FIG. 3, items 216 can be items that sellers 302 wishing to sell and offers to purchase 218 can be offers created by buyer 304.

As depicted, blockchain engine 234 can also perform a matching between items and offers to purchase. In this illustrative example, a matching 238 has been identified between a number of item tokens 248 and request token 250 and a matching token 246 has been generated in response to the identified matching 238. Based on the user profile and past transaction history for the owner of the request token 250, the matching token can be presented to the owner of the request token 250 for approval or for requesting additional input to ensure satisfaction for the transaction. If matching 238 is rejected, the matching token generated based on matching 238 is either updated with additional specifications or is destroyed with a new matching token created with necessary modifications. When matching 238 is accepted, smart contract 236 triggers instructions for the exchange of the custody of physical assets and the exchange of fiat and virtual currency for the transaction 312.

In this illustrative example, blockchain engine 234 generates a number of smart contracts 236 for sellers 302 and buyer 304 to facilitate transaction 312 between item tokens 248, which represents items 216 and request token 250, which represents an offer from offers to purchase 218.

In this example, each seller of sellers 302 can have a seller account 314 using a key 322 on blockchain platform 208. Similarly, buyer 304 can have a buyer account 316 using a key 324 on blockchain platform 208. Buyer account 316 and sellers account 314 can be associated with various functions. For example, buyer account 316 and sellers account 314 can be used by sellers 302 and buyer 304 to submit information associated with items 216 and offers to purchase 218. In another illustrative example, buyer account 316 and sellers account 314 can also have the capability for buyer 304 and sellers 302 to monitor transactions 312 and track status of items 216 after transactions 312 have been executed.

In one illustrative example, buyer 304 and sellers 302 can be connected by buyer account 316 and sellers account 314 for communication purposes. For example, buyer 304 and seller 302 can negotiate terms for transactions 312 through messages 306 and messages 308. Smart contracts 236 can be subsequently updated based on the message content from messages 306 and messages 308. In this illustrative example, messages 306 can be outgoing messages from buyer 304 or incoming messages received by buyer 304, while messages 308 can be outgoing messages from sellers 302 or incoming messages received by sellers 302.

Responsive to finalization of the transaction terms, blockchain engine records transactions 312 and the transaction terms in blockchain 328 on blockchain platform 208. Blockchain 328 on blockchain platform 208 is a type of distributed ledger, which includes digitally recorded, unmodifiable data in packages called blocks. A distributed ledger, as used throughout this document, refers to a computer-only technology that enables the distributed recordation of transactions maintained by a network of computers. A distributed ledger is a consensus of replicated, shared, and synchronized digital data geographically spread across multiple computers which may be in different sites, countries, and/or institutions maintained by many different parties. A blockchain is an example of a distributed ledger.

Blockchain 328 on blockchain platform 208 can be a distributed database that maintains a continuously growing list of ordered records called blocks. Each block contains a timestamp and a link to a previous block, with the hash of the prior block linking the two. By design, blockchains are inherently resistant to modification of the data because, once recorded, the data in a block cannot be altered retroactively. Through the use of a peer-to-peer network, and one or more distributed timestamping servers, a blockchain database may be managed autonomously. Thus, blockchains may be used to provide an open, distributed ledger that can record transactions between parties efficiently and in a verifiable and permanent way.

Computer system 202 is also configured to store tokens 318 in a database 310. In this illustrative example, database 310 can be one of the distributed database managed by blockchain 328 as mentioned. Tokens 318 is a collection of all item tokens, request tokens, and matching tokens generated by blockchain platform 208. In this illustrative example, database 310 classifies the matching tokens based on whether the transactions of a matching token are successfully executed. In this illustrative example, the matching algorithm of blockchain platform 208 will create a relationship between tokens upon matching and create another relationship between tokens upon successful execution of transactions between matched tokens.

In addition, the database 310 also includes trades 320. Trades 320 can be an example of trades 206 in FIG. 2. As depicted above, a number of transactions can be facilitated by blockchain platform 208 based on one matching token. Here, trades 320 is a collection of all transactions facilitated by blockchain platform 208. In this illustrative example, trades 320 includes transaction terms 326 gathered from all transactions facilitated by blockchain platform 208, for example, transaction terms from transactions 312.

In this illustrative example, blockchain platform 208 uses information of tokens 318 and trade 320 in database 310 to create a tokens mapping 330 to show the relationship and hierarchy of different tokens. Tokens mapping 330 can be subsequently used for monitoring flow of commodities, supply chain management, tracking production/purchasing of commodities, resource management, and regulatory applications. In some illustrative examples, payment history and fiat or virtual currency movement as part of transactions can also be tracked through tokens mapping.

Figure 4:
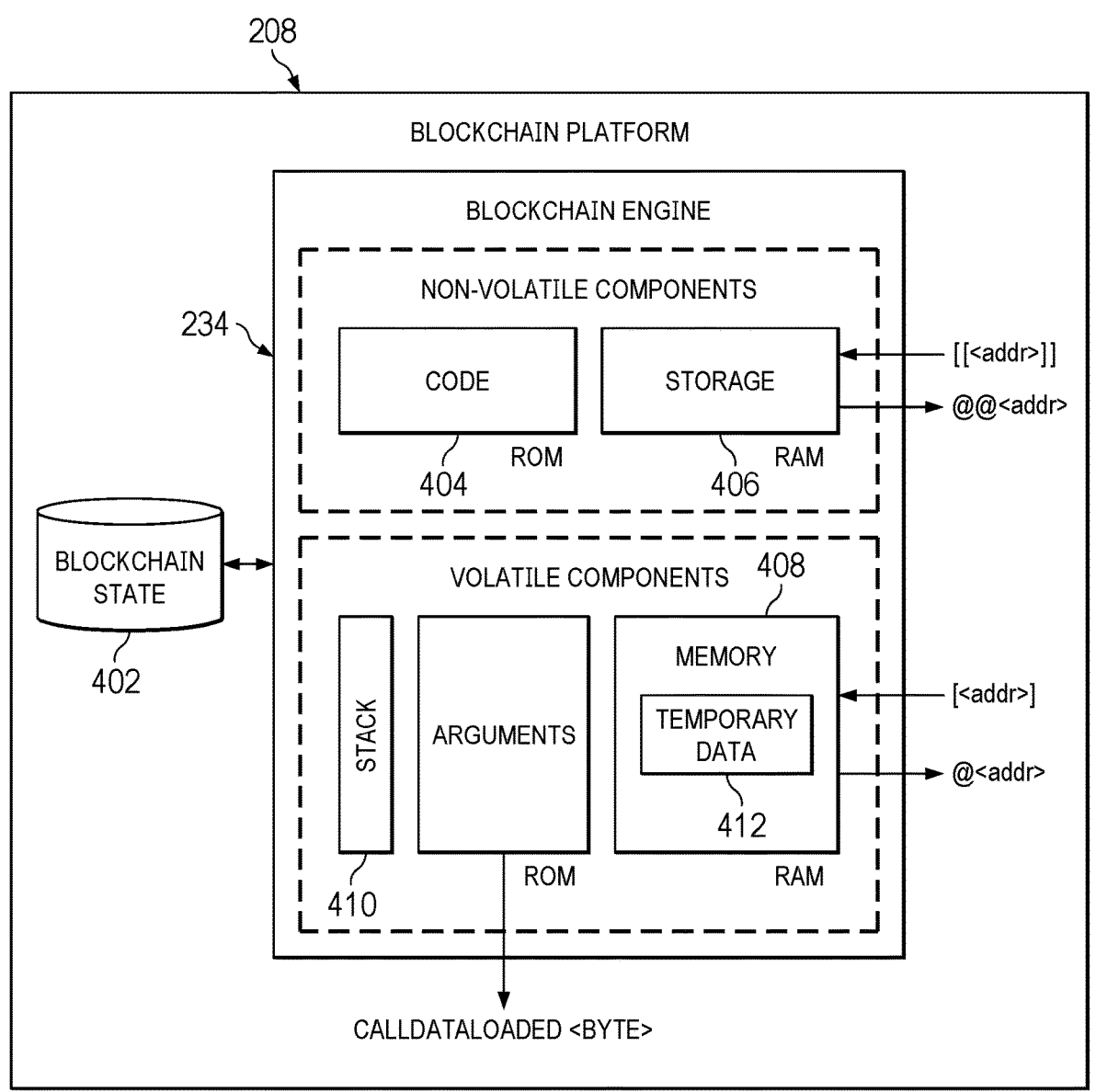
FIG. 4 is a block diagram of an execution environment for executing a smart contract using the blockchain platform.

With reference next to FIG. 4, a block diagram of an execution environment for executing a smart contract using the blockchain platform is depicted in accordance with an illustrative embodiment. In the illustrative examples, the execution environment illustrated in FIG. 4 can be an execution environment for executing smart contracts 236 in FIG. 2 and FIG. 3. It should be noted that the same reference numeral may be used in more than one figure. This reuse of a reference numeral in different figures represents the same element in the different figures.

Blockchain platform 208 includes a number of different components. As depicted, blockchain platform 208 includes blockchain engine 234 and blockchain state 402.

Blockchain engine 234 can also be responsible for internal-account state and transaction-computation for the blockchain. Blockchain engine 234 performs state-transitions for smart contracts. In this illustrative example, blockchain engine 234 is a stack-based architecture that uses a last-in, first-out stack. Blockchain engine 234 executes transactions recursively, computing the system state and the machine state for each loop. Blockchain engine 234 includes non-volatile and volatile components.

Storage 406 is non-volatile and is maintained on the blockchain of blockchain platform 208 as part of the system state. Every smart contract on the blockchain of blockchain platform 208 has its own storage. Storage 406 preserves all the state variables for the smart contract that do not change between the function calls.

Code 404 are the functions associated with smart contracts such as smart contracts 236 from FIG. 2 and FIG. 3. Code 404 are instructions that formally specify the meaning and ramifications of a transaction or message. Code 404 is stored in a virtual ROM that cannot be changed after construction. Blockchain engine 234 executes code 404 in response to receiving a message call to the smart contract.

Memory 408 is volatile and is cleared between external function calls. Memory 408 stores temporary data 412, such as, function arguments, local variables, and return values. Stack 410 is used to hold temporary values when conducting calculations in blockchain engine 234.

Blockchain state 402 is combined state of all accounts that have interacted with the blockchain of blockchain platform 208, mapping blockchain addresses to accounts and account states. In an illustrative example, blockchain state 402 is not be stored on the blockchain of blockchain platform 208, but rather in a data structure on a backend state database that maintains the mapping. Blockchain engine 234 relies on blockchain state 402 for execution of certain instructions.

Figure 5:
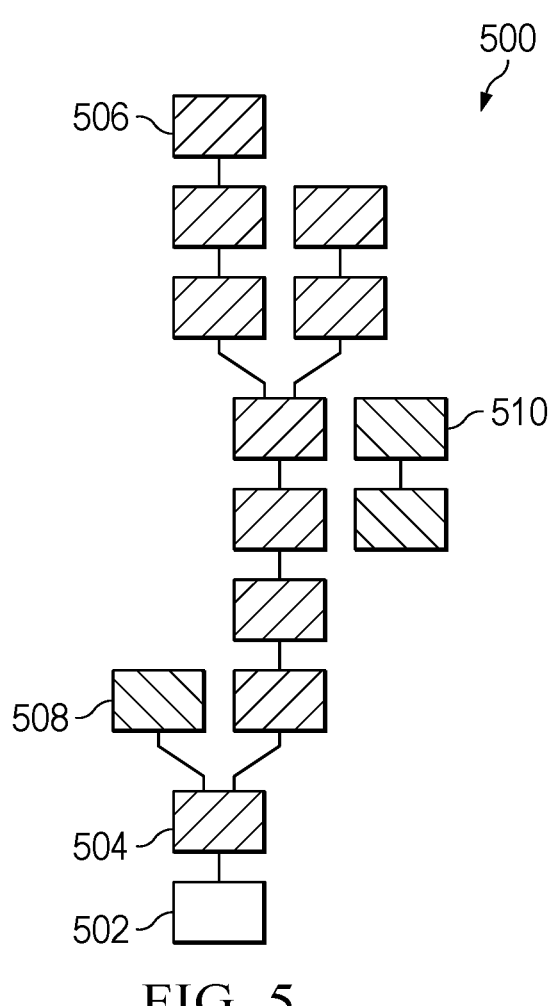
FIG. 5 is an illustration of a distributed ledger in the form of a blockchain in accordance with an illustrative embodiment.

FIG. 5 is an illustration of a distributed ledger in the form of a blockchain depicted in accordance with an illustrative embodiment.

Blockchain 500 starts with root block 502. Blocks indicated with a right-leaning hash, such as block 504 or block 506, are part of the main chain. Blocks with a left-leaning hash, such as block 508 or block 510, exist outside of blockchain 500.

Thus, blockchain 500 is a heaviest path from root block 502 to block 506 through the entire block tree. The "heaviest" path through the block tree, i.e., the path that has had the most computation done upon it, is conceptually identified as blockchain 500. Identifying blockchain 500 in this manner allows a decentralized consensus to be achieved for the state of blockchain 500.

Figure 6:
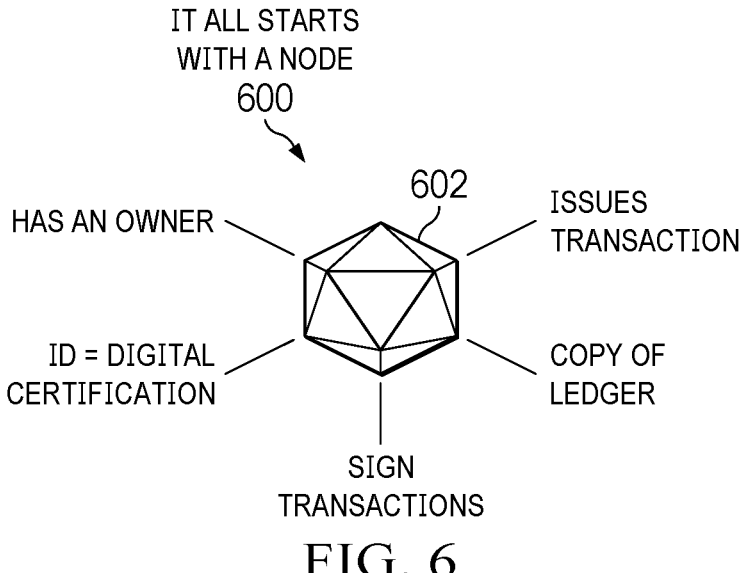
FIG. 6 is an illustration of a first step in creating a blockchain in accordance with an illustrative embodiment.
Figure 7:
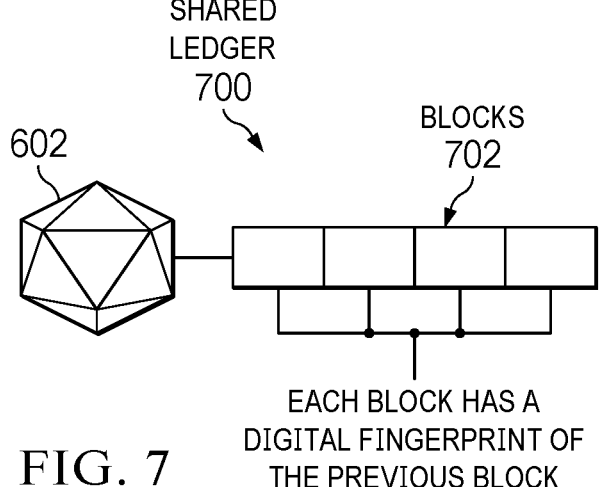
FIG. 7 is an illustration of a second step in creating a blockchain in accordance with an illustrative embodiment.
Figure 8:
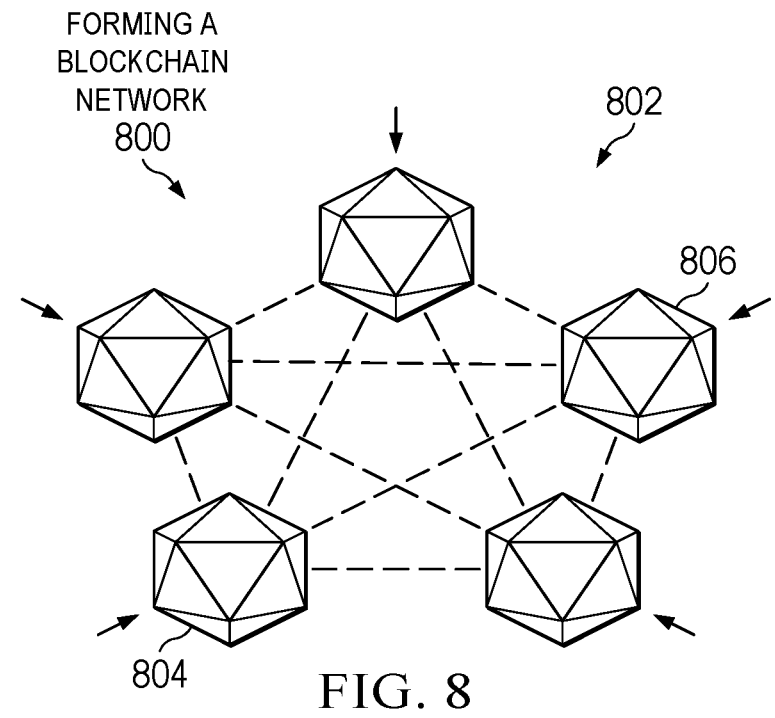
FIG. 8 is an illustration of a third step in creating a blockchain in accordance with an illustrative embodiment.
Figure 9:
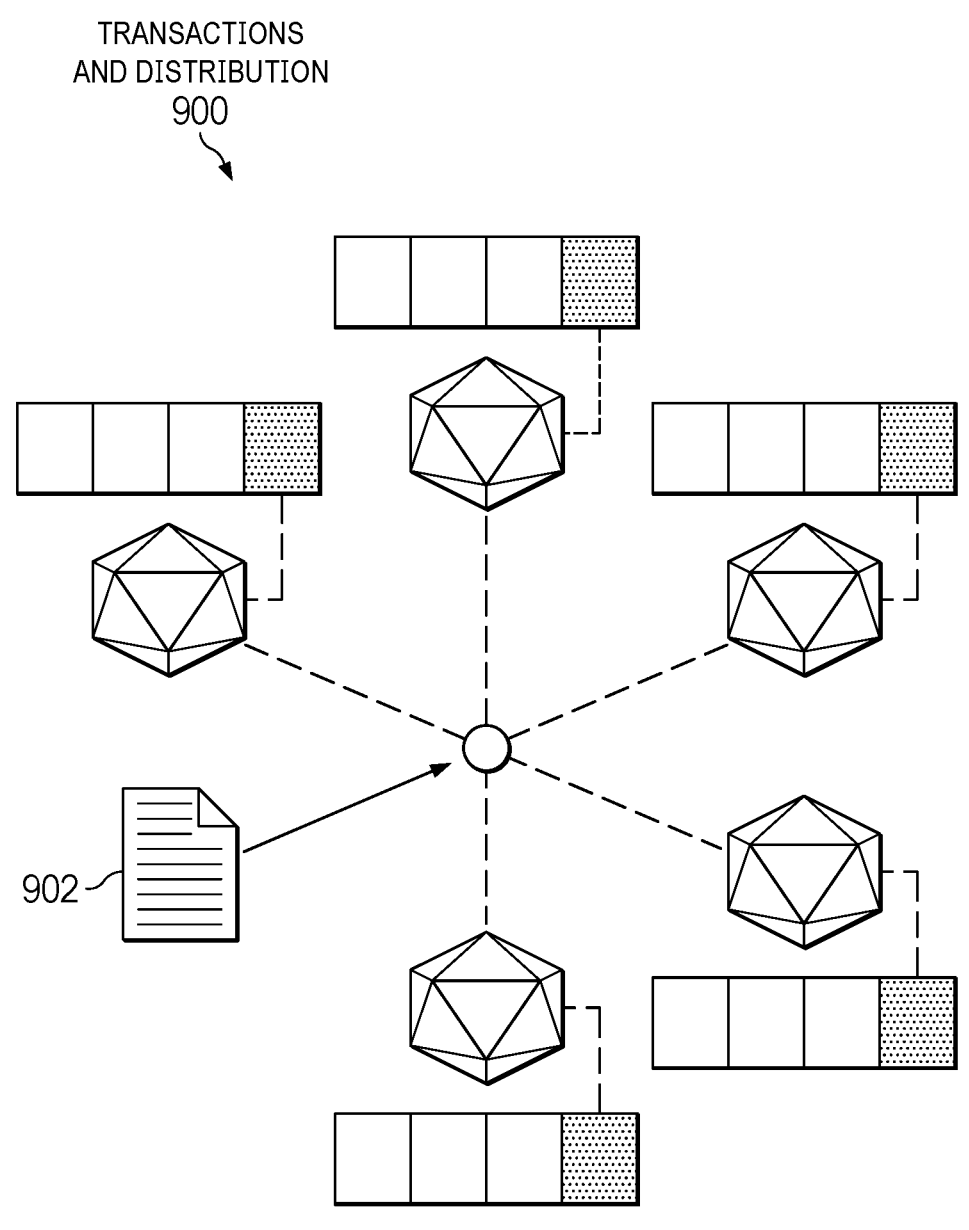
FIG. 9 is an illustration of a fourth step in creating a blockchain in accordance with an illustrative embodiment.
Figure 10:
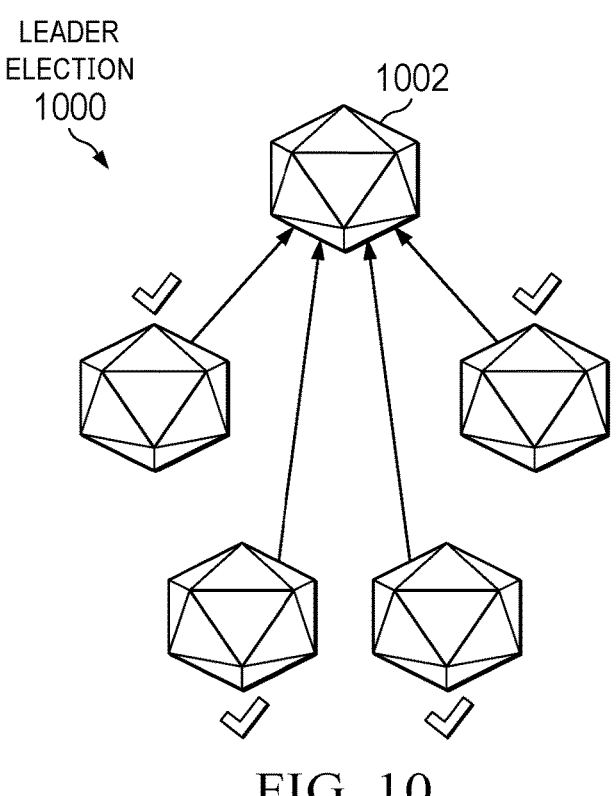
FIG. 10 is an illustration of a fifth step in creating a blockchain in accordance with an illustrative embodiment.
Figure 11:
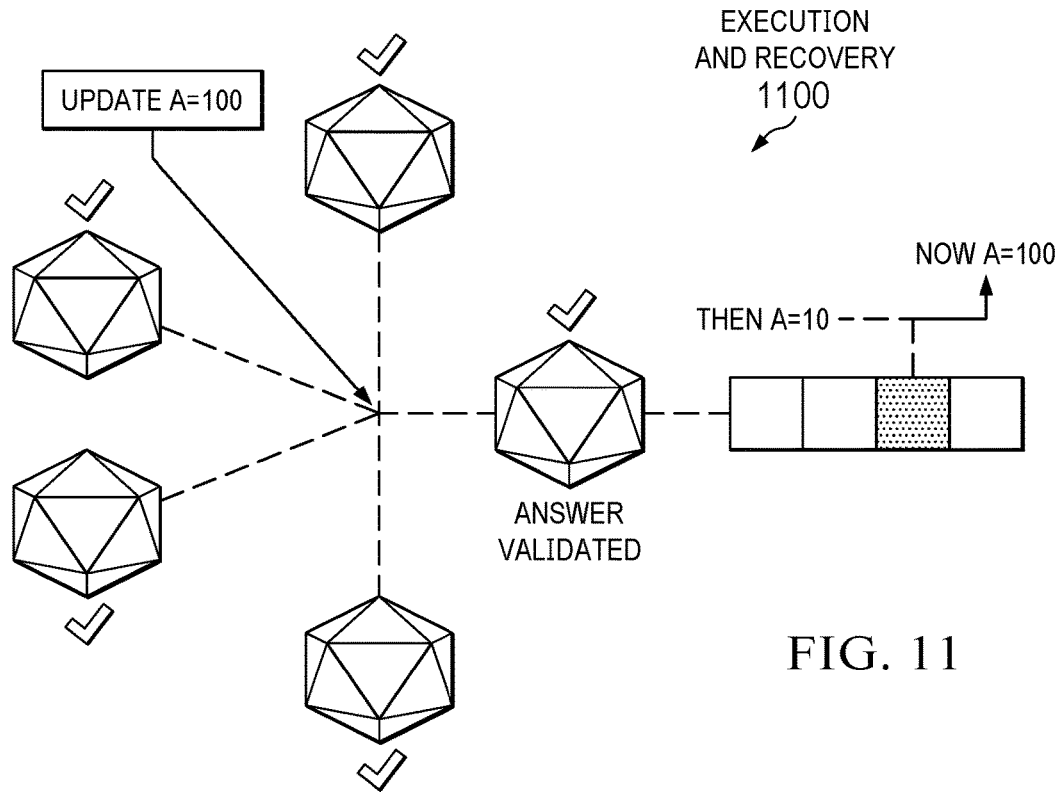
FIG. 11 is an illustration of a sixth step in creating a blockchain in accordance with an illustrative embodiment.

FIG. 6 through FIG. 11 should be considered together. FIG. 6 is an illustration of a first step in creating a blockchain in accordance with an illustrative embodiment. FIG. 7 is an illustration of a second step in creating a blockchain in accordance with an illustrative embodiment. FIG. 8 is an illustration of a third step in creating a blockchain in accordance with an illustrative embodiment. FIG. 9 is an illustration of a fourth step in creating a blockchain in accordance with an illustrative embodiment. FIG. 10 is an illustration of a fifth step in creating a blockchain in accordance with an illustrative embodiment. FIG. 11 is an illustration of a sixth step in creating a blockchain in accordance with an illustrative embodiment. FIG. 6 through FIG. 11 may be implemented on a computer or on multiple computers in a network environment. FIG. 6 through FIG. 11 address a technical problem that only exists in computer programming and execution. As used throughout FIG. 6 through FIG. 11, common reference numerals refer to common objects in these figures.

In operation 600 shown in FIG. 6, account 602, also sometimes referred to as a "node," is a state object recorded in a shared ledger that represents the identity of agents that can interact with the ledger. Account 602 includes an owner, a digital certificate identification, and a copy of a ledger. Account 602 may sign transactions and inspect the blockchain and its associated state. A user may issue transactions, signed by account 602, to interact with the blockchain. The combined state of all accounts that have interacted with the blockchain is the state of the blockchain.

In operation 700 shown in FIG. 7, account 602 collates transactions and distributions into blocks 702, and adds blocks 702 to the shared ledger. Blocks 702 function as a journal, recording a series of transactions together with the previous block and an identifier for the final state of the blockchain. Blocks 702 are chained together using a cryptographic hash as a means of reference—each block in the shared ledger has a digital fingerprint of the previous block. In this manner, it is not possible to alter previous blocks without being detected.

In operation 800 shown in FIG. 8, blockchain network 802 is formed. Blockchain network 802 may include multiple local copies of blockchains such as those shown in FIG. 6 or FIG. 7. Each account, such as account 804 or account 806, has its own blockchain.

In operation 900 shown in FIG. 9, transaction 902 is issued from an account, such as account 804 or account 806 in FIG. 8. Transaction 902 is an instruction constructed and cryptographically-signed by an account, such as such as account 804 or account 806 in FIG. 8.

Transaction 902 can result in message calls to other accounts. Transactions that result in message calls contain data specifying input data for the message. Alternatively, transaction 902 can be "contract creation" transactions, which result in the creation of new agent accounts.

Transactions are collated into blocks that are added to local blockchain copies by the various accounts. The blockchain is synchronized across the various nodes. Thus, each account in blockchain network 802 in FIG. 8 adds identical blocks to a local copy of the blockchain.

In operation 1000 shown in FIG. 10, leader election takes place. Leader account 1002 takes priority for deciding which information is the most accurate or up-to-date. Identifying information by leader account 1002, and validating this information by other accounts, allows a decentralized consensus to be achieved throughout the blockchain network 802 for the state of blockchain 500.

In operation 1100 shown in FIG. 11, data execution and recovery take place. A query regarding data stored in one or more of the nodes may return a validated answer regarding contents in the blocks.

Figure 12:
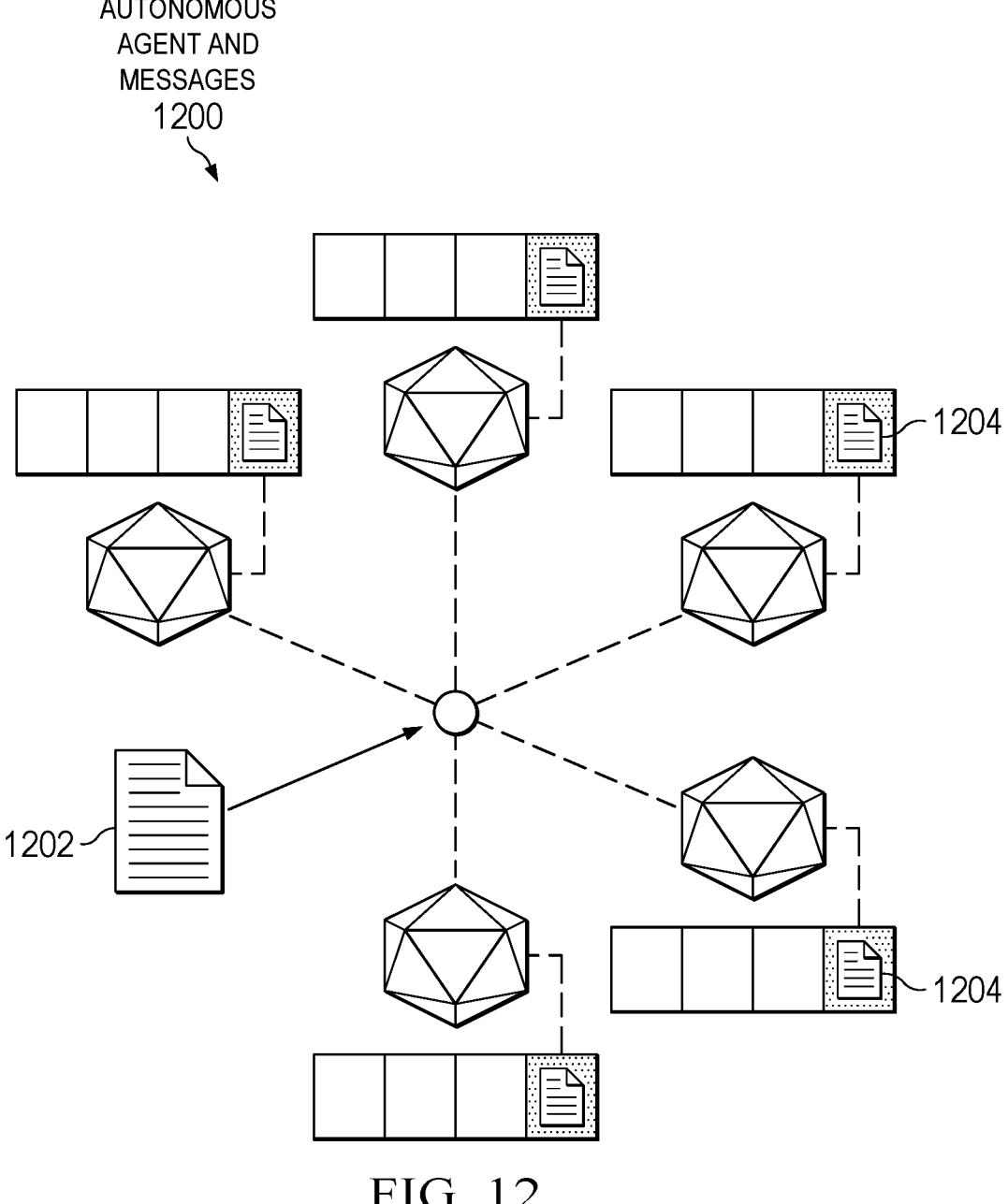
FIG. 12 is an illustration of a creation of a smart contract in accordance with an illustrative embodiment.
Figure 13:
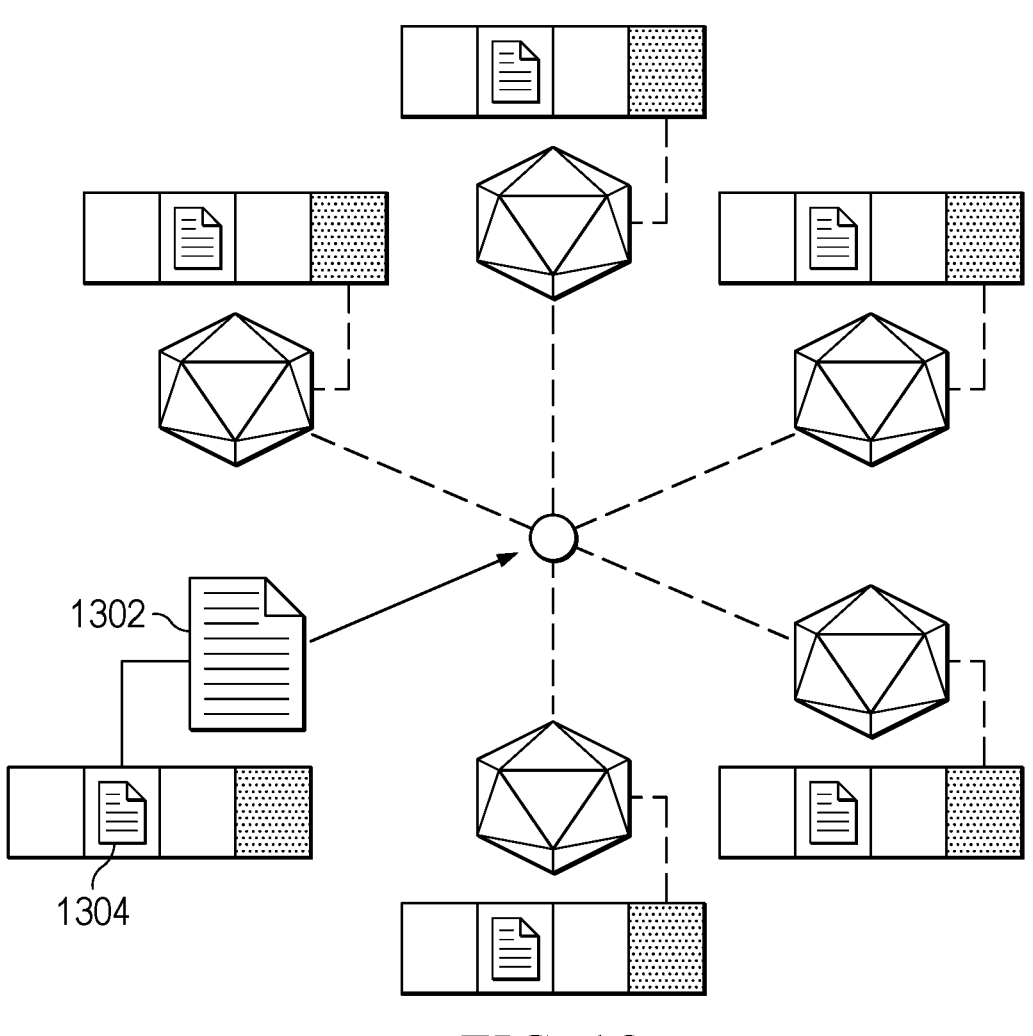
FIG. 13 is an illustration of an operation of a smart contract in accordance with an illustrative embodiment.

FIG. 12 and FIG. 13 should be considered together. FIG. 12 is an illustration of a step in creating a smart contract within a blockchain in accordance with an illustrative embodiment. FIG. 13 is an illustration of a step in creating a blockchain using a smart contract within a blockchain in accordance with an illustrative embodiment. FIG. 12 and FIG. 13 may be implemented on a computer or on multiple computers in a network environment.

In operation 1200 shown in FIG. 12, transaction 1202 is a "contract creation" transaction that results in the creation of smart contract 1204. In this illustrative example, transaction 1202 contains data specifying initialization code for smart contract 1204.

Smart contract 1204 is a type of account existent only within the blockchain execution environment. Smart contract 1204 is not associated with an external account, but rather is a notional object that resides at a specific address on the blockchain. Smart contract 1204 includes both code such as functions, and data such as state. Smart contract 1204 has direct control over its own state and storage memory to preserve persistent state variables. When referenced, either through a transaction or due to the internal execution of code, smart contract 1204 executes its associated functions.

Smart contracts have a number of desirable properties. Execution of the smart contract is managed automatically by the network. Documents are encrypted on a shared ledger that is duplicated many times over on different nodes of the network, ensuring that the data is true and correct. Because smart contracts on distributed ledgers cannot be modified, they provide an immutable record of submitted workflow transactions that is highly resistant to post-transaction changes.

Transaction 1202 contains data specifying initialization code for smart contract 1204. Each account in a blockchain network executes this initialization code to incorporate smart contract 1204 into the blockchain. At creation of smart contract 1204, initialization code is executed to retrieve the associated functions of smart contract 1204, after which the initialization code can be discarded.

In operation 1300 shown in FIG. 13, smart contract 1204 generates message 1302. Message 1302 is an instruction constructed by smart contract 1304 in response to receiving a message. Because smart contract 1304 exists only within the blockchain execution environment, message 1302 is only a "virtual transaction" sent by code from one account to another.

Message 1302 can specify input data that results in message calls for other accounts, allowing smart contract 1304 to read and write to internal storage. Alternatively, message 1302 can contain data specifying initialization code, allowing smart contract 1304 to create additional smart contracts.

The associated functions of smart contract 1304 can be executed as part of state transition and block validation. If a transaction is added into a block, the code execution spawned by that transaction will be executed by all accounts that download and validate the block.

Figure 14:
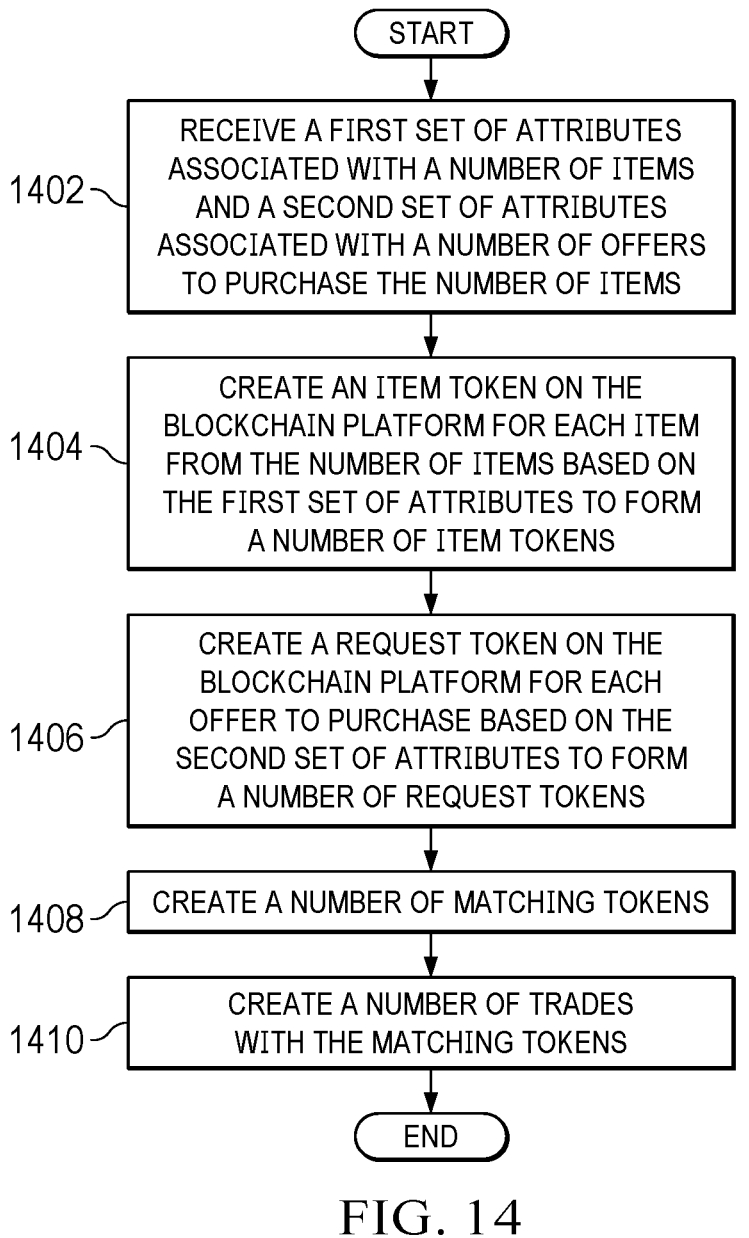
FIG. 14 is a flowchart of a process for managing tokens in accordance with an illustrative embodiment.

Turning next to FIG. 14, a flowchart of a process for managing tokens is depicted in accordance with an illustrative embodiment. The process in FIG. 14 can be implemented in hardware, software, or both. When implemented in software, the process can take the form of program instructions that is run by one of more processor units located in one or more hardware devices in one or more computer systems. For example, the process can be implemented in blockchain engine 234 in computer system 202 in FIG. 2.

The process begins by receive a first set of attributes associated with a number of items and a second set of attributes associated with a number of offers to purchase the number of items (step 1402). The process creates an item token on a blockchain platform for each item from the number of items to form a number of item tokens (step 1404). In this illustrative example, the item tokens are created based on the first set of attributes associated with the number of items.

Next, the process creates a request token on the blockchain platform for each offer to purchase to form a number of request tokens (step 1406). In this illustrative example, the request tokens are created based on the second set of attributes associated with the number of offers to purchase.

The process creates a number of matching tokens (step 1408). In this illustrative example, each matching token includes a one request token and one or more item tokens. Here, the one request token and one or more item tokens of each matching token are matched according to their attributes.

The process creates a number of trades with the matching tokens (step 1410). In this illustrative example, each trade of the number of trades are created based on a matching between one request token and one of the item tokens from a matching token. The process terminates thereafter.

With reference to FIG. 15, a flowchart of a process for managing smart contract with tokens is depicted in accordance with an illustrative embodiment. The process in FIG. 15 is an example of additional steps that can be performed with the process in FIG. 14.

The process generates a number of smart contracts with transaction terms (step 1502). In step 1502, each smart contract includes transaction terms for a trade depicted above. In this illustrative example, the transaction terms for smart contract of a trade are determined based on information associated with matching tokens that generate the trade.

The process executes the number of smart contracts according to the transaction term (step 1504). As depicted, executed smart contracts facilitate transactions between owners of item tokens and owners of request tokens of matchings.

The process transfers the number of item tokens and the number of request tokens according to the transaction terms (step 1506). The process records the number of smart contracts with transaction terms and trades and transactions associated the number of smart contracts to the blockchain platform (step 1508).

In step 1508, the recordation can be performed by recording number of smart contracts with transaction terms and trades and transactions associated the number of smart contracts into a block that can be added to a distributed ledger maintained by the blockchain platform. The process terminates thereafter.

With reference to FIG. 16, a flowchart of a process for analyzing tokens is depicted in accordance with an illustrative embodiment. The process in FIG. 16 is an example of additional steps that can be performed with the process in FIG. 14.

The process stores the matching tokens to a relational database (step 1602). In step 1602, all information related to the matching tokens are stored to the relational database. As depicted, information relates to the matching tokens can include item tokens and request token in each matching tokens, the executed transactions of trades based on each matching tokens, and transactions terms associated with the transactions.

The process generates a mapping of tokens in the relational database (step 1604). As depicted, the mapping of tokens illustrates show the relationships and hierarchy of different tokens. In this illustrative example, the mapping of tokens is generated based on the information associated with tokens including request tokens, items tokens, and matching tokens, and trades, transactions, and transaction terms associated with the tokens. As depicted, the relational database classifies the matching tokens based on whether the transactions of a matching token are successfully executed. The process will create a relationship between tokens of a matching upon matching and create another relationship between tokens of a matching token upon successful execution of transactions between matched tokens. The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 17:
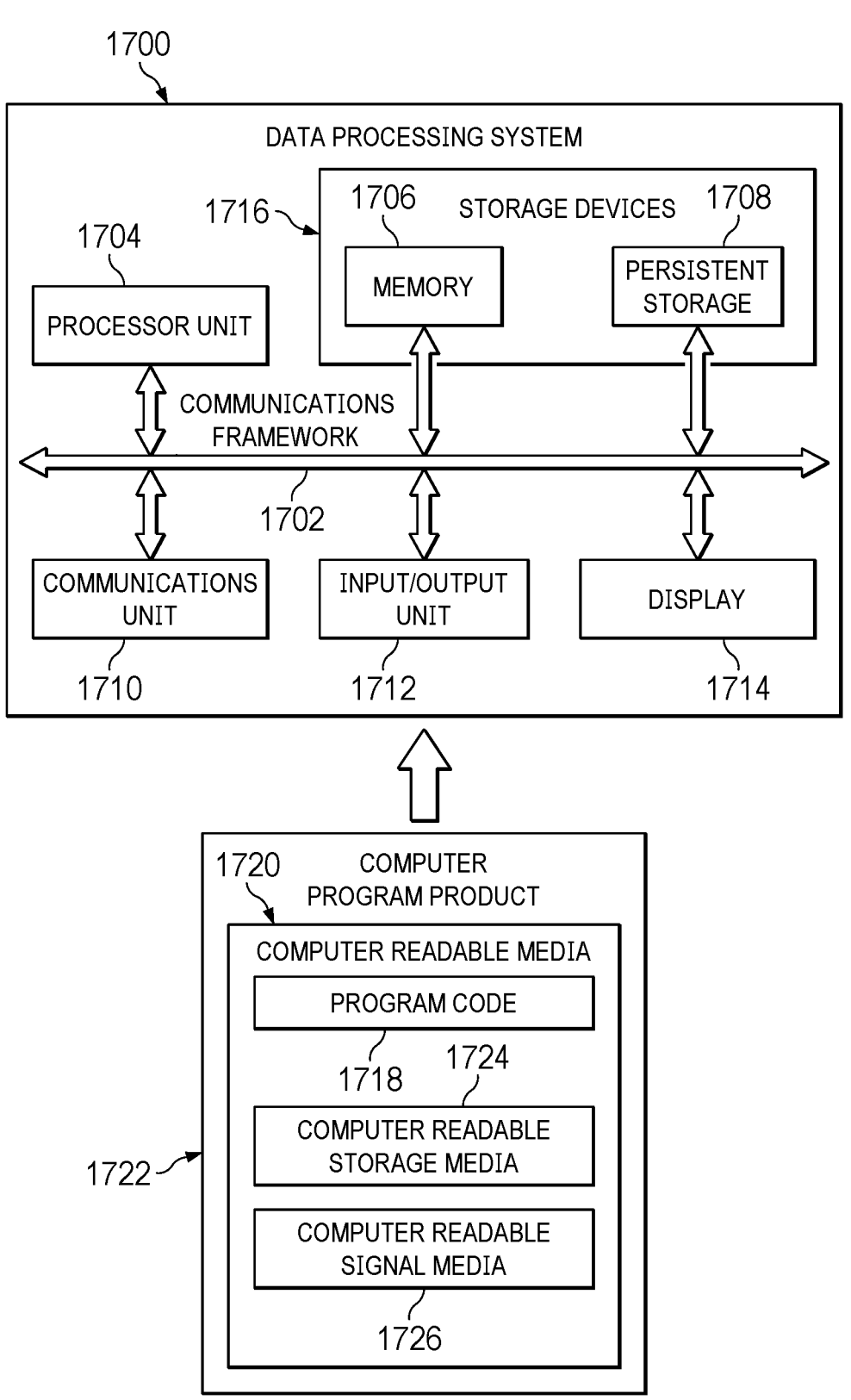
FIG. 17 is a block diagram of a data processing system in accordance with an illustrative embodiment.

Turning now to FIG. 17, an illustration of a block diagram of a data processing system is depicted in accordance with an illustrative embodiment. Data processing system 1700 may be used to implement computer system 202 and other data processing systems that may be used in tokens management environment 200 in FIG. 2.

In this illustrative example, data processing system 1700 includes communications framework 1702, which provides communications between processor unit 1704, memory 1706, persistent storage 1708, communications unit 1710, input/output (I/O) unit 1728, and display 1714. In this example, communications framework 1702 may take the form of a bus system.

Processor unit 1704 serves to execute instructions for software that may be loaded into memory 1706. Processor unit 1704 may be a number of processors, a multi-processor core, or some other type of processor, depending on the particular implementation.

Memory 1706 and persistent storage 1708 are examples of storage devices 1816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1716 may also be referred to as computer readable storage devices in these illustrative examples. Memory 1706, in these examples, may be, for example, a random access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a solid state hard drive, a flash memory, a rewritable optical disk, a rewritable magnetic tape, or some combination of the above. The media used by persistent storage 1708 also may be removable. For example, a removable hard drive may be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that may be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs may be located in storage devices 1716, which are in communication with processor unit 1704 through communications framework 1702. The processes of the different embodiments may be performed by processor unit 1704 using computer-implemented instructions, which may be located in a memory, such as memory 1706.

These instructions are referred to as program code, computer usable program code, or computer readable program code that may be read and executed by a processor in processor unit 1704. The program code in the different embodiments may be embodied on different physical or computer readable storage media, such as memory 1706 or persistent storage 1708.

Program code 1718 is located in a functional form on computer readable media 1720 that is selectively removable and may be loaded onto or transferred to data processing system 1700 for execution by processor unit 1704. Program code 1718 and computer readable media 1720 form computer program product 1722 in these illustrative examples. In one example, computer readable media 1720 may be computer readable storage media 1724 or computer readable signal media 1726.

In these illustrative examples, computer readable storage media 1724 is a physical or tangible storage device used to store program code 1718 rather than a medium that propagates or transmits program code 1718.

Alternatively, program code 1718 may be transferred to data processing system 1700 using computer readable signal media 1726. Computer readable signal media 1726 may be, for example, a propagated data signal containing program code 1718. For example, computer readable signal media 1726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1700 are not meant to provide architectural limitations to the manner in which different embodiments may be implemented. The different illustrative embodiments may be implemented in a data processing system including components in addition to or in place of those illustrated for data processing system 1700. Other components shown in FIG.

17 can be varied from the illustrative examples shown. The different embodiments may be implemented using any hardware device or system capable of running program code 1718.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for managing tokens on a blockchain platform, the computer implemented method comprising:
 using a number of processor units to perform the steps of:
 receiving a first set of attributes associated with a number of items and a second set of attributes associated with a number of offers to purchase the number of items;
 creating an item token on the blockchain platform for each item from the number of items based on the first set of attributes to form a number of item tokens;
 creating a request token on the blockchain platform for each offer to purchase based on the second set of attributes to form a number of request tokens;
 creating a number of matching tokens, wherein each matching token comprises one request token and one or more item tokens, and wherein the request token and item tokens comprising the matching token are matched according to their attributes; and
 creating a number of trades with the matching tokens, wherein each trade comprises a match between the one request token and one of the item tokens comprising the matching token.

2. The computer implemented method of claim 1, wherein the blockchain platform is a permissioned blockchain platform.

3. The computer implemented method of claim 1, wherein the first set of attributes associated with the number of items comprises at least one of geographic origin of items, grade of items, status of items, quantity of items, or price of items.

4. The computer implemented method of claim 1 further comprising:
 storing matching tokens to a relational database; and
 generating a mapping of tokens in the relational database based on attributes of tokens and relationship between tokens in the relational database.

5. The computer implemented method of claim 1, wherein the first set of attributes and second set of attributes are generated by extracting information associated with the number of items and information associated with the number of offers to purchase using a machine learning model.

6. The computer implemented method of claim 5 further comprising:

further training the machine learning model with information associated with the number of trades and the matching tokens.

7. The computer implemented method of claim 1 further comprising:

generating a number of smart contracts with transaction terms, wherein the transaction terms are determined based on information associated with matching tokens; and executing the number of smart contracts according to the transaction terms using a blockchain engine.

8. The computer implemented method of claim 7 further comprising:

transferring the number of item tokens and the number of request tokens according to the transaction terms.

9. The computer implemented method of claim 8 further comprising:

recording the number of trades and the transaction terms by collating transactions and the transaction terms into a block that can be added to a distributed ledger maintained by the blockchain platform.

10. The computer implemented method of claim 1, wherein the request tokens and the item tokens are created with a number of customizable templates, wherein the number of customizable templates are created using at least one of:

manual inputs from users; or a mapping of tokens based on attributes of tokens and relationship between tokens.

11. The computer implemented method of claim 1, wherein the request tokens created for the number of offers to purchase are non-fungible tokens and item tokens created for the number of items are fungible tokens.

12. A computer system for managing datasets for managing tokens on a blockchain platform, the computer system comprising:

a storage device that stores program instructions; and a number of processor units in communication with the storage device, wherein the number of processor units executes program instructions to:

receive a first set of attributes associated with a number of items and a second set of attributes associated with a number of offers to purchase the number of items;

create an item token on the blockchain platform for each item from the number of items based on the first set of attributes to form a number of item tokens;

create a request token on the blockchain platform for each offer to purchase based on the second set of attributes to form a number of request tokens;

create a number of matching tokens, wherein each matching token comprises one request token and one or more item tokens, and wherein the request token and item tokens comprising the matching token are matched according to their attributes; and create a number of trades with the matching tokens, wherein each trade comprises a match between the one request token and one of the item tokens comprising the matching token.

13. The computer system of claim 12, wherein the blockchain platform is a permissioned blockchain platform.

14. The computer system of claim 12, wherein the first set of attributes associated with the number of items comprises at least one of geographic origin of items, grade of items, status of items, quantity of items, or price of items.

15. The computer system of claim 12, wherein the number of processor units executes program instructions to:

store matching tokens to a relational database; and generate a mapping of tokens in the relational database based on attributes of tokens and relationship between tokens in the relational database.

16. The computer system of claim 12, wherein the first set of attributes and second set of attributes are generated by extracting information associated with the number of items and information associated with the number of offers to purchase using a machine learning model.

17. The computer system of claim 16, wherein the number of processor units executes program instructions to:

further train the machine learning model with information associated with the number of trades and the matching tokens.

18. The computer system of claim 12, wherein the number of processor units executes program instructions to:

generate a number of smart contracts with transaction terms, wherein the transaction terms are determined based on information associated with the matching tokens; and execute the number of smart contracts according to the transaction terms using a blockchain engine.

19. The computer system of claim 18, wherein the number of processor units executes program instructions to:

transfer the number of item tokens and the number of request tokens according to the transaction terms.

20. The computer system of claim 18, wherein the number of processor units executes program instructions to:

record the number of trades and the transaction terms by collating transaction and the transaction terms into a block that can be added to a distributed ledger maintained by the blockchain platform.

21. The computer system of claim 12, wherein the request tokens and the item tokens are created with a number of customizable templates, wherein the number of customizable templates are created using at least one of:

manual inputs from users; or a mapping of tokens based on attributes of tokens and relationship between tokens.

22. The computer system of claim 12, wherein the request tokens created for the number of offers to purchase are non-fungible tokens and item tokens created for the number of items are fungible tokens.

23. A computer program product for managing tokens on a blockchain platform, the computer program product comprising a computer-readable storage medium having program instructions embodied therewith, the program instructions executable by a computer system to cause the computer system to perform a method of:

receiving a first set of attributes associated with a number of items and a second set of attributes associated with a number of offers to purchase the number of items;

creating an item token on the blockchain platform for each item from the number of items based on the first set of attributes to form a number of item tokens;

creating a request token on the blockchain platform for each offer to purchase based on the second set of attributes to form a number of request tokens;

creating a number of matching tokens, wherein each matching token comprises one request token and one or more item tokens, and wherein the request token and item tokens comprising the matching token are matched according to their attributes; and creating a number of trades with the matching tokens, wherein each trade comprises a match between the one request token and one of the item tokens comprising the matching token.

24. The computer program product of claim 23, wherein the blockchain platform is a permissioned blockchain platform.

25. The computer program product of claim 23, wherein the first set of attributes associated with the number of items comprises at least one of geographic origin of items, grade of items, status of items, quantity of items, or price of items.

26. The computer program product of claim 23 further comprising:

storing matching tokens to a relational database; and generating a mapping of tokens in the relational database based on attributes of tokens and relationship between tokens in the relational database.

27. The computer program product of claim 23, wherein the first set of attributes and second set of attributes are generated by extracting information associated with the number of items and information associated with the number of offers to purchase using a machine learning model.

28. The computer program product of claim 27 further comprising:

further training the machine learning model with information associated with the number of trades and the matching tokens.

29. The computer program product of claim 23 further comprising:

generating a number of smart contracts with transaction terms, wherein the transaction terms are determined based on information associated with matching tokens; and executing the number of smart contracts according to the transaction terms using a blockchain engine.

30. The computer program product of claim 29 further comprising:

transferring the number of item tokens and the number of request tokens according to the transaction terms.

31. The computer program product of claim 29 further comprising:

recording the number of trades and the transaction terms by collating transaction and the transaction terms into a block that can be added to a distributed ledger maintained by the blockchain platform.

32. The computer program product of claim 23, wherein the request tokens and the item tokens are created with a number of customizable templates, wherein the number of customizable templates are created using at least one of:

manual inputs from users; or a mapping of tokens based on attributes of tokens and relationship between tokens.

33. The computer system of claim 23, wherein the request tokens created for the number of offers to purchase are non-fungible tokens and item tokens created for the number of items are fungible tokens.

* * * * *